United States Patent [19]

Nielsen

[11] Patent Number: 4,649,230
[45] Date of Patent: Mar. 10, 1987

[54] ELECTRICAL UNIVERSAL CONNECTING BOX

[76] Inventor: Alf Nielsen, No. 1 Tørvelodsvej, DK 3360 Liseleje, Denmark

[21] Appl. No.: 740,270

[22] PCT Filed: Sep. 10, 1984

[86] PCT No.: PCT/DK84/00084
§ 371 Date: May 17, 1985
§ 102(e) Date: May 17, 1985

[87] PCT Pub. No.: WO85/01396
PCT Pub. Date: Mar. 28, 1985

[30] Foreign Application Priority Data

Sep. 23, 1983 [DK] Denmark ............................ 4364/83

[51] Int. Cl.$^4$ ............................................. H02G 3/08
[52] U.S. Cl. ................................. 174/65 R; 174/50; 339/103 R; 220/266
[58] Field of Search .............. 174/65 R, 50, 52 R, 174/66; 339/103 R, 103 C, 107; 220/3.2, 266

[56] References Cited

U.S. PATENT DOCUMENTS

| | | | |
|---|---|---|---|
| 1,148,699 | 8/1915 | McWilliams | 220/266 X |
| 2,620,081 | 12/1952 | Lear, Jr. | 220/3.8 |
| 3,279,014 | 10/1966 | Fischer | 174/65 R X |
| 3,859,454 | 1/1975 | Mann | 174/66 |
| 3,864,512 | 2/1975 | Meadow | 174/66 |

FOREIGN PATENT DOCUMENTS

| | | | |
|---|---|---|---|
| 2933818 | 3/1981 | Fed. Rep. of Germany | 174/50 |
| 61678 | 11/1939 | Norway | 174/65 R |
| 269338 | 4/1927 | United Kingdom | 220/266 |

Primary Examiner—Arthur T. Grimley
Assistant Examiner—D. A. Tone
Attorney, Agent, or Firm—Bacon & Thomas

[57] ABSTRACT

For application to different standard dimensions of wires, cables or tubes an electrical connecting box is designed with a lower part (1) with a bottom (2) and upright side walls (6) therefrom, and an upper part (8) in the form of a cover having side walls for arrangement against a circumferential shoulder portion (11) on the side walls of the lower part (1). In the side walls (6) of the lower part one or more sets (16) of parallel punch lines (17-20) are formed extending from the bottom onto the shoulder portion (11) of the side wall. In the adjoining side wall the upper part (8) is formed with punch lines (21-23) shaped substantially as circular arcs so that in the assembled condition of the box blank portions of different sizes may be punched out to be adapted to individual wire, cable or tube dimensions. By designing also the upper part with blank portions limited by punch lines (29-31) and adapted to standard designs of electrical light dimmers, interruptors and/or plug-in switches, on one hand, and the passage of wires for lamp suspensions or the like, on the other hand the box may, in addition, be used as a switch casing or a ceiling box for lamp suspensions.

8 Claims, 8 Drawing Figures

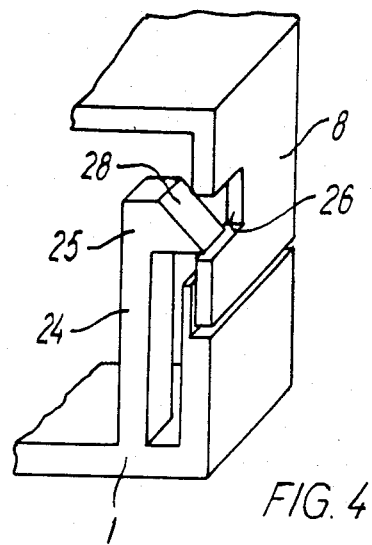
FIG. 4
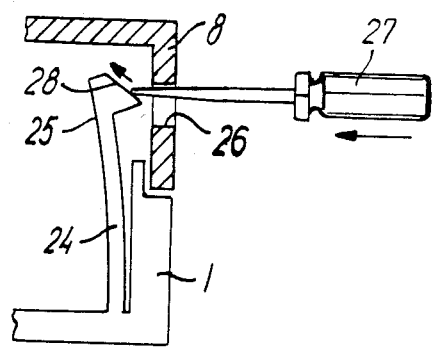
FIG. 5
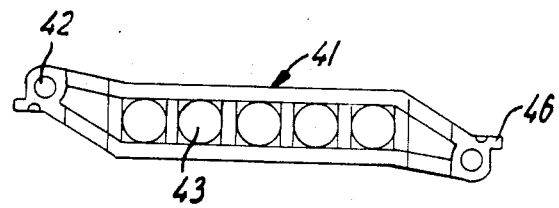
FIG. 6
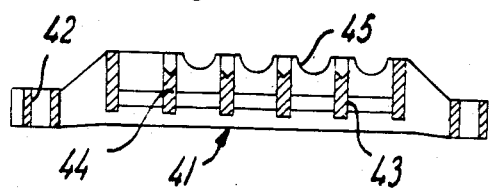
FIG. 7
FIG. 8
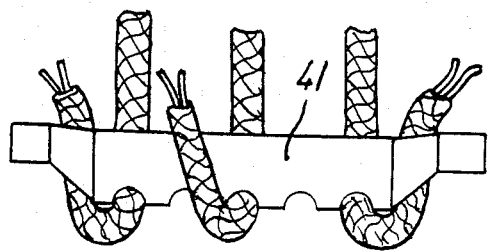

ELECTRICAL UNIVERSAL CONNECTING BOX

The invention relates to an electrical connecting box for low voltage installations comprising a lower part having a bottom to be arranged against a fixed support and an upper part adapted for securing to the lower part, said upper part having side walls in at least one of which a number af punch-out blank portions for providing openings for electrical insulation tubes, wires and/or cables are defined by a set of punch lines, one of which forms a common border for the blank portions at one side thereof.

In most known electrical connecting boxes the size of the punch-out blank portions is usually adapted to a single cable dimension, i.e. the maximum cable dimension for which the box in question is intended. Therefore, when using the blank portions for smaller cable dimensions specially designed plugs or bushings will have to be used in such boxes, said plugs or bushings fitting externally into the size of the blank portion and having a through-bore adapted to the desired cable dimension.

In addition to making installation works more expensive, the need for the electrician to hold a storage of a greater selection of boxes and accessories and to take such a selection with him to a given site of installation is a disadvantage is practice.

However, from Norwegian Pat. No. 61678 and German Pat. No. 611474 installation boxes are known, in which the side walls of the housing have blank portions for different wire, cable and tube dimensions defined by a set of punch lines which in the embodiment according to the former publication coincide and form a common border for all the blank portions at one side thereof.

Relative to these prior art designs, in which a set of blank portions are provided in one and the same wall portion of a lid or a cover for the box so that the number of wire dimensions which may be introduced into the box will be limited to the number of blank portions in said set, e.g. three, it is the object of the invention to obtain a further improved flexibility with respect to the number of types of wires, cables and insulation tubes which without any difficulty may be introduced into the box through blank portions and, thereby, further increase the universal applicability of the box to all practically available standard dimensions of insulation tubes, cables and wires of flat and round cross section.

According to the invention such a universal box is characterized in that the lower part has upright side walls on all sides, said side walls having a circumferential shoulder part forming an abutment for edges of the side walls of the upper part, each set of punch lines comprising in the side walls of the upper part a number of punch lines formed substantially as circular arcs and extending to said edges, each of these set of punch lines having a corresponding set of punch lines in the adjoining side wall of the lower part, said latter punch lines being parallel straight lines at right angles to the bottom of the lower part.

With this design blank portions may be punched out in said adjoining side walls of the lower and upper parts adapted to individual cable dimensions with a safe location and without using special accessories. The proportioning of the side wall of the lower part and the set of punch lines therein may advantageously be such that the part of the side wall of the lower part located between the bottom and the circumferential shoulder part suits the smallest cable dimension for which the box is intended, such as flexible wires or flat cables so that these may be introduced without removing any blank portion from the side wall of the upper part.

In preferred embodiments of the invention the universal applicability of the box is further improved for use not only as a wiring box, but also as a switch casing and/or lamp connection box in that additional punch lines are formed in the upper part for defining blank portions adapted to one or more standard designs of electrical interruptors and/or plug-in switches and/or to the passage of wires for lamp suspensions or the like. Thereby, one and the same box may be used both as a connecting box and a switch box.

In the following the invention will be further explained with reference to the drawings, in which FIGS. 1 and 2 are perspective views of the lower part with associated cable tension relieving devices and the upper part, respectively, of an embodiment of the connecting box according to the invention;

FIGS. 4 and 5 are perspective views of locking devices for securing the upper part to the lower part; and FIGS. 6 to 8 show a wire tension relieving device.

Figure 1:
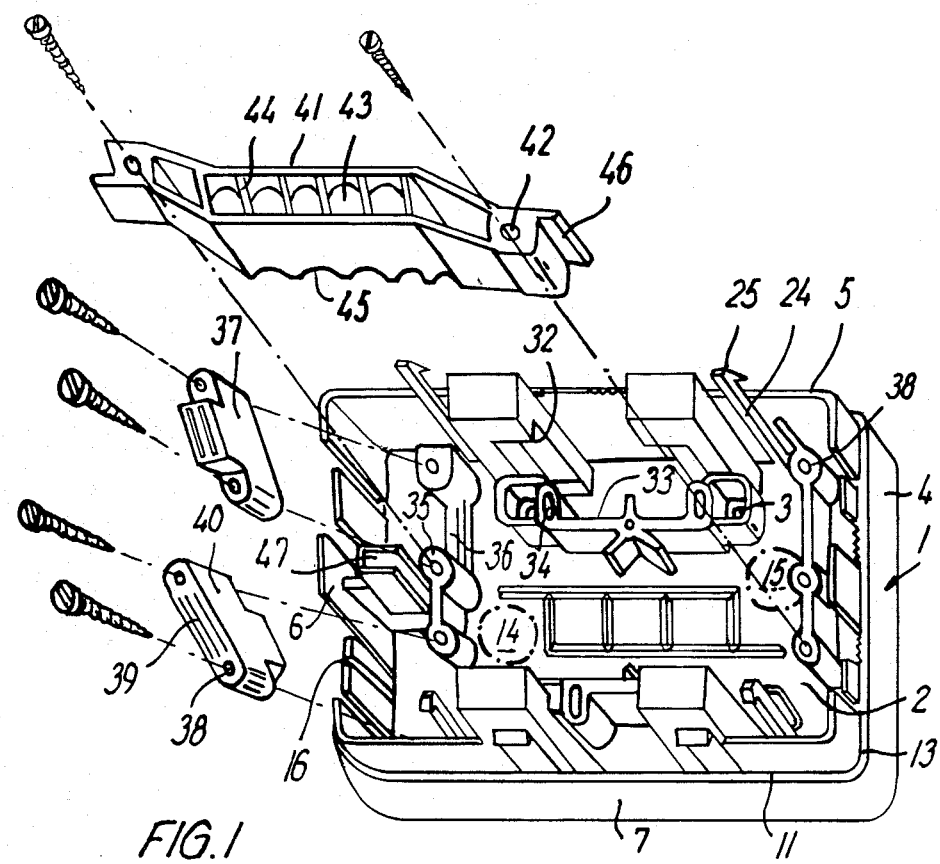
Figure 2:
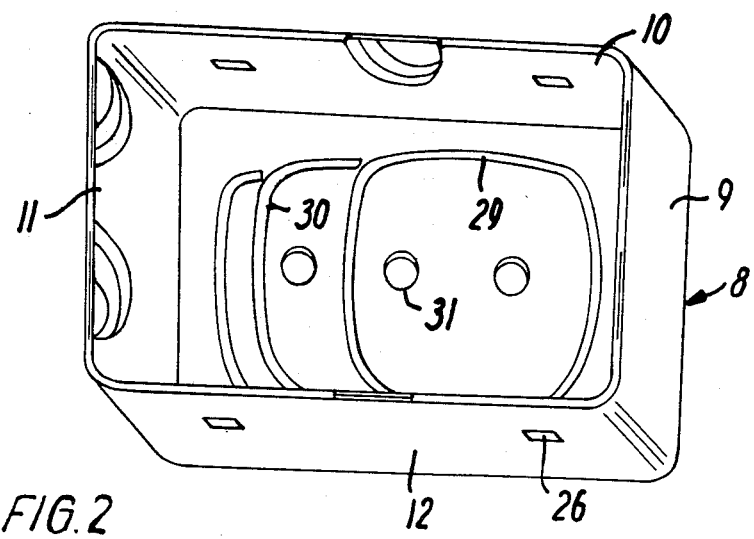

As shown in FIGS. 1 and 2 a connecting box according to the invention may be substantially box-shaped, the box comprising a lower part 1 with a bottom 2 in which screw holes 3 may be formed for mounting the box to a fixed support and with side walls 4 to 7 projecting upright from the bottom 2 as well as an upper part 8 designed as a lid having side walls 9 to 12.

The side walls 9 to 12 of the upper part 8 cover a part of the side walls 4 to 7 of the lower part 1, said latter side walls being formed with a circumferential shoulder portion 13 as an abutment for the edge of the side walls 9 to 12 of the upper part 8.

In addition to the screw holes 3 the bottom 2 of the lower part 1 is formed with two circular blank portions 14 and 15 defined by punch lines, by the punching-out of which openings are formed for the introduction of electrical insulation tubes having the standard dimension ⅜ inches.

In the embodiment shown there are formed in each of the side walls 4 and 6 of the lower part two sets and in each of the side walls 5 and 7 one set of parallel straight punch lines as shown at 16 for one of the punch line sets in the side wall 6. As shown in FIG. 5 the punch lines of these sets extend from the bottom 2 at right angles to the shoulder portion 11 of the side wall, and each set comprises four parallel punch lines 17 to 20, one of which 17 is disposed at a distance from the three remaining ones 18 to 20, which have approximately the same mutual separation. As further shown in FIG. 3 the wall thickness of the side wall has been reduced at the punch line set 16.

Figure 3:
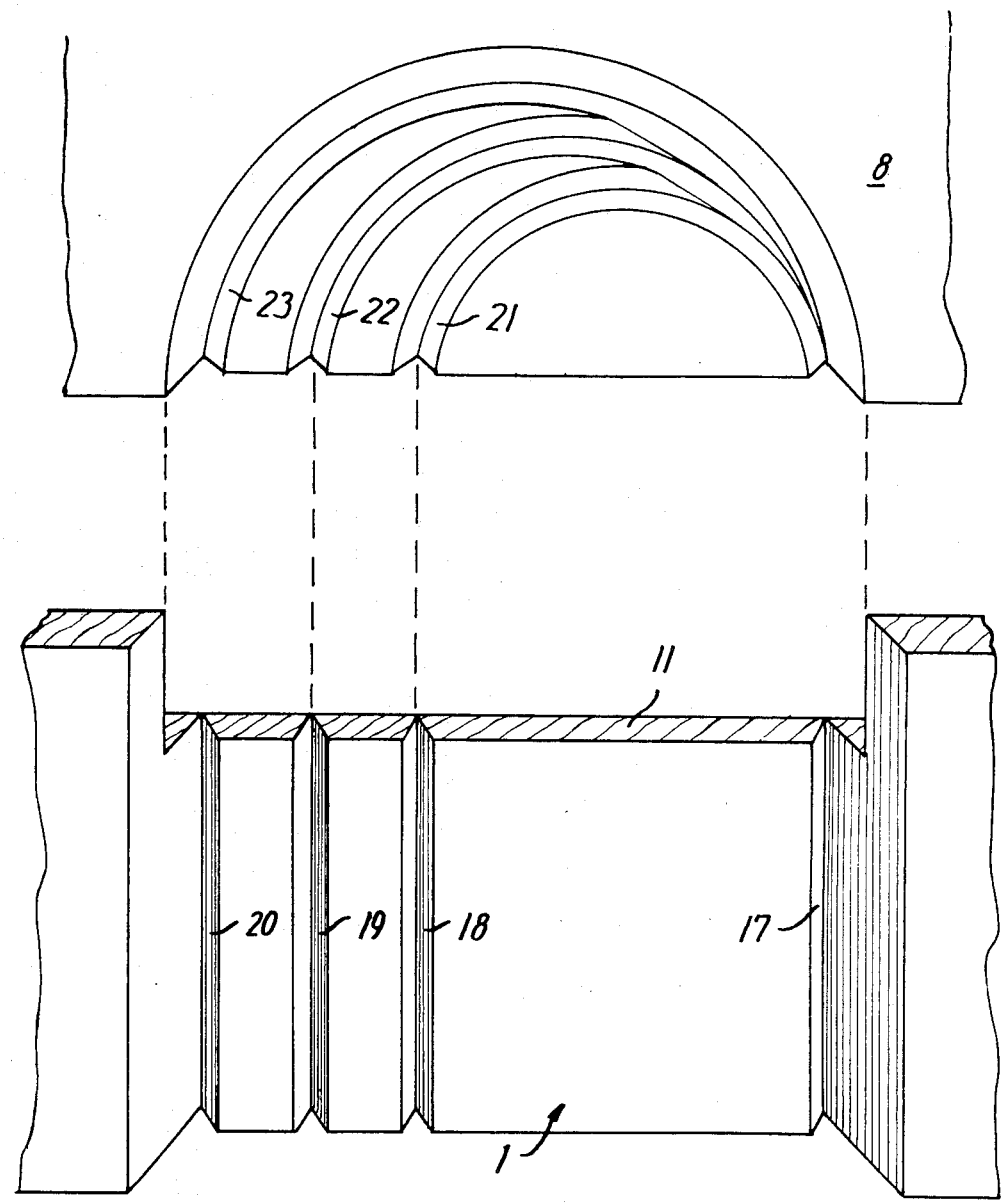
FIG. 3 shows a section of a side wall viewed from the interior of the box.

As most clearly shown in the view in FIG. 3 of a section of a side wall with the lower part 1 and the upper part 8 removed from each other as seen from the interior there is formed for each punch line set in the side walls 4 to 7 of the lower part 1 a set of punch lines 21 to 23, formed substantially as circular arcs, in the adjoining side wall of the upper part. These punch lines 21 to 23 extend to the edge of the side wall of the upper part, in one side opposite the punch line 17 and in the other side opposite each of the punch lines 18, 19 and 20 of the punch line set 16 in the side wall of the lower part 1. Thus, at the edge of the side wall of the upper part the punch line 21 in the upper part ends opposite the punch lines 17 and 18, the punch line 22 opposite the punch lines 17 and 19 and the punch line 23 opposite the punch lines 17 and 20.

Thereby, each punch line set will provide the possibility of punching-out blank portions corresponding to individual standard dimensions of cables, wires or tubes. Thus, when punching-out, e.g. a blank portion in the side wall of the lower part 1 between the punch lines 17 and 18 and corresponding punching-out of the blank portion in the side wall of the upper part limited by the punch line 21, an opening adapted to the cross section of standard cables having two to four conductors is provided when arranging the upper part 8 on the lower part 1. When punching-out a blank portion in the lower part between the punch lines 17 and 19 an opening is provided which, when arranging the upper part without punching-out blank portion therein, is adapted to the cross section of a standard flat cable, whereas by punching-out the same blank portion in the lower part and simultaneous punching-out of the blank portion in the upper part limited by the punch line 22 an opening is provided adapted to a standard five conductor cable of circular cross section. When punching-out a blank portion between the punch lines 18 and 20 or possibly 19 and 20 openings are provided in a corresponding manner adapted to thinner flexible wires of different diameter. Finally, when punching-out blank portions limited by the punch lines 17 and 20 of the lower part and the punch line 23 in the upper part an opening is provided adapted to the cross section of a standard insulation tube having a diameter of ⅝ inches.

As shown in FIG. 3, each of the punch lines 17 to 20 in the side walls of the lower part and the punch lines 21 and 23 in the side walls of the upper part has the shape of a nick-like depression to a reduction of the wall thickness of about 75%.

In the embodiment shown the upper part 8 is fastened to the lower part 1 by means of snap-locking devices, upright elastically deformable pins 24 having locking projections 25 being provided at the two opposite side walls 5 and 7 of the lower part 1 as shown in FIGS. 4 and 5 for engagement with cut-outs 26 in the opposite side wall of the upper part 8. Thereby, the upper part 8 may be lifted off from the lower part 1 as shown in FIG. 5 by depressing the locking projection 25 formed as a nose portion by means of a simple hand tool such as a screwdriver 27. With the illustrated form of the nose portion 25 with an obliquely cut upper side the upper part 8 will simultaneously be automatically lifted off from the lower part 1 by this release of the locking engagement.

In the embodiment shown the field of application of the box according to the invention is further enlarged so that the box may, in addition, be used as a switch casing and/or as a ceiling box for a lamp suspension in that the upper part 8 is formed with punch lines 29-30 and 31 as shown in FIG. 2 for defining blank portions adapted to standard designs for electrical light dimmers, interruptors and plug-in switches, on one hand, and to the passage of wires for lamp suspensions, on the other hand. Thus, by punching-out only the square blank portion limited by the punch line 29 a light dimmer or a standard interruptor may be mounted in the upper part 8, and by punching-out this blank portion as well as the adjoining rectangular blank portion limited by the punch line 30 a corresponding plug-in switch may be mounted in the upper part.

For the arrangement of such standard interruptors or plug-in switches the lower part 1 is formed at shown in FIG. 1 with fastening devices in form of catching members 32, on one hand, for fastening interruptors or switches of the kind having elastically biased catching members on the part to be inserted into a switch casing or in the form of projections 33, on the other hand, having pre-drilled holes for fastening screws for interruptors or light dimmers.

For the purpose of relieving the tension of inserted flexible wires of different size in the box according to the invention the bottom 2 of the lower part 1 may be formed as shown in FIG. 1 with two sets of projecting ribs 35 having cut-outs 36 for fastening such different wire dimensions by means of tension relieving fittings 37 which is clamped firmly by screwing screws into screw holes 38.

As further illustrated in FIG. 1 different wire sizes may be fastened by one and the same tension relieving fitting 37 of a special design comprising two screw holes 38a extending between a flat side 39 and an opposite side having a projecting central portion 40 between the screw holes 38a. By using the flat side 39 for engagement against a wire a relatively great wire dimension may be fastened by means of the fitting 37. By turning the fitting so as to use the projecting central portion 40 for engagement against the wire, a wire of a smaller cross section may be fastened by means of the same tension relieving fitting 37.

In a corresponding manner, wires of lamp suspensions may be relieved of their tension by means of a tension relieving device 41, shown in FIG. 1, said device having screw holes 42 and such a length as to be mountable in the lower part by means of screw holes in each of the two sets of projecting ribs 35. The device 41 is designed as a common tension relieving means for a number of lamp suspension wires corresponding to the number of blank portions in the cover 8 for the passage of such wires. For this purpose the device 41 is provided as shown in FIGS. 6 to 8 with a number of aligned wire ducts 43 between the screw holes and in parallel relationship thereto, in the embodiment shown seven such ducts, between which partitions 44 are provided which in the mounted position of the tension relieving device 41 terminate at a distance from the bottom 2. Moreover, the side walls of the tension relieving device 41 are formed with cut-outs 45 opposite each wire duct 43, said cut-outs being open towards the bottom 2.

As shown in FIG. 6 the screw holes 42 of the tension relieving device 41 are displaced to either side of the central plane through the wire ducts 43 and, moreover, in alignment with the screw holes 42 the device is formed with end guide member 46 for engagement with upright guide rails 47 in the lower part of the box, so that it can be retained accurately in its position with respect to the blank portions in the upper part 8 and with a good safety against capsizing and for reliable wire fastening against rib-shaped projections 9 on the bottom 2 of the lower part 1.

I claim:

1. An electrical connecting box for low voltage installations comprising a lower part (1) having a bottom (2) to be arranged against a fixed support and an upper part (8) adapted for securing to the lower part (1), said upper part having side walls (9-12) in at least one of which a number of punch-out blank portions for providing openings for electrical insulation tubes, wires and- /or cables are defined by a set of punch lines (21-23), one of which forms a common border for the blank portions at one side thereof, characterized in that the lower part (1) has upright side walls (4-7) on all sides, said side walls having a circumferential shoulder part (11) forming an abutment for edges of the side walls (9-12) of the upper part (8), each set of punch lines comprising in the side walls (9-12) of the upper part (8) a number of punch lines formed substantially as circular arcs and extending to said edges, each of these set of punch lines having a corresponding set of punch lines (16) in the adjoining side wall of the lower part, said latter punch lines (17-20) being parallel straight lines at right angles to the bottom (2) of the lower part (1).

2. An electrical connecting box as claimed in claim 1, characterized in that additional punch lines (29, 30) are formed in the upper part (8) for defining punch-out blank portions adapted for one or more standard designs or electrical light dimmers, interrupters and/or plug-in switches, means (32-34) being provided in the lower part for holding such standard designs.

3. An electrical connecting box as claimed in claim 1 or 2, characterized in that additional punch lines (31) are formed in the upper part (8) for defining blank portions adapted for the passage of wires for lamp suspensions or the like.

4. An electrical connecting box as claimed in claim 1 or 2, characterized in that the lower part (1) is provided with upright elastically deformable pins (24) having locking projections (25) for engagement with cutouts (26) in the side walls (10, 12) of the upper part (8).

5. An electrical connecting box as claimed in claim 4, characterized in that said locking projections (25 are formed as nose portions having obliquely cut upper sides (28).

6. An electrical connecting box as claimed in claim 1 or 2, characterized in that the bottom (2) is provided with upright ribs (35) having screw holes (38) for tension relieving fittings (37) for fastening various wire dimensions.

7. An electrical connecting box as claimed in claim 6, characterized by a tension relieving fitting (37) common to several dimensions having two screw holes (38a) extending between a flat side (39) and an opposite side with a projecting central portion (40) between the screw holes (38a).

8. An electrical connecting box as claimed in claim 6, characterized by an elongate tension relieving device (41) cooperating with said blank portions for wires for lamp suspensions and having two screw holes (42) and a number of aligned wire ducts (43) between the screw holes (42) and in parallel relationship thereto with partitions (44), which in the mounted condition of the tension relieving device terminate at a distance from the bottom (2) of the lower part (1), at least one side wall of the tension relieving fitting (41) being formed with cut-outs (45) opposite each wire duct (43) and opening towards the bottom of the box.

* * * * *